(12) United States Patent
Su et al.

(10) Patent No.: US 7,428,537 B2
(45) Date of Patent: Sep. 23, 2008

(54) SEARCHING METHOD AND SYSTEM FOR COMMERCIAL INFORMATION

(75) Inventors: Barry R. Su, La Puente, CA (US); Ruiyi Ma, Diamond Bar, CA (US); Grace Su, La Puente, CA (US)

(73) Assignee: Tyloon, Inc, El Monte, CA (US)

( * ) Notice: Subject to any disclaimer, the term of this patent is extended or adjusted under 35 U.S.C. 154(b) by 0 days.

(21) Appl. No.: 11/136,267

(22) Filed: May 23, 2005

(65) Prior Publication Data

US 2006/0265360 A1 Nov. 23, 2006

(51) Int. Cl.
G06F 7/00 (2006.01)
G06F 17/30 (2006.01)

(52) U.S. Cl. ..................... 707/5; 707/3; 707/4

(58) Field of Classification Search ............ 707/2, 707/3; 704/277, 8; 706/16, 20
See application file for complete search history.

(56) References Cited

U.S. PATENT DOCUMENTS

| | | | | |
|---|---|---|---|---|
| 2001/0029455 | A1* | 10/2001 | Chin et al. | 704/277 |
| 2002/0026475 | A1* | 2/2002 | Marmor | 709/203 |
| 2002/0111792 | A1* | 8/2002 | Cherny | 704/8 |
| 2005/0086214 | A1* | 4/2005 | Seewald et al. | 707/3 |
| 2006/0036582 | A1* | 2/2006 | Sondergaard et al. | 707/3 |

OTHER PUBLICATIONS

Zhang et al. "A Multilingual (Chinese, English) Indexing, Retrieval, Searching Search Engine", Proceedings of INET '99, Jun. 22-25, 1999.*

* cited by examiner

*Primary Examiner*—Christian P. Chace
*Assistant Examiner*—Michael J Hicks
(74) *Attorney, Agent, or Firm*—Raymond Y. Chan; David and Raymond Patent Firm

(57) ABSTRACT

A commercial information search system includes an information center and a search interaction platform. The information center includes an information database storing a plurality of web data characterized by a plurality of languages respectively, wherein the information center is adapted for a user accessing through a public communication network. The search interaction platform is communicatively linking with the information center, wherein when a search request with a selected language is sent to the information center through the public communication network, the information center sorts out the web data to match with the search request to generate a search result based on the web data with the selected language, so as to eliminate unrelated web data with other languages being translated into the selected language to be shown in the search result.

7 Claims, 3 Drawing Sheets

SEARCHING METHOD AND SYSTEM FOR COMMERCIAL INFORMATION

BACKGROUND OF THE PRESENT INVENTION

1. Field of Invention

The present invention relates to information technology, and more particularly to a search system and method thereof for searching commercial information, wherein a search request and a search result are both confined to predetermined languages so as to optimize a search application for particular users.

2. Description of Related Arts

With the advance of information technology, searching information through Internet has become part of their daily life for many people. A typical search process usually involves the submission of a search request to a search server which is linked to a particular search database, a matching of the search request with the relevant information in that search database, and production of a search result by the search server, wherein the search result is transmitted from the search server to the user's terminal and displayed by a displaying device, such as a monitor.

As a matter of fact, the majority of websites posted on Internet are in written in English. This is partly because English, being recognized international language, is widely accepted all over the world. Conventional search engines, such as yahoo and google are usually user-friendly and interactive so that they present little problems for daily applications.

Difficult problems however, arise when one is trying to search a local website using an English-based search engine, or indeed search engines in any other language different that of the local website. For example, using an English version yahoo to search for a Chinese or a French local website (which do not written in English) is very inconvenient. In order to resolve such difficulty, some search engines incorporates translation function whereby websites in a particular local language is translated by a predetermined dictionary so that the local websites (after translation) are matched and sorted alongside with the language of the search request so as to broaden the scope of the corresponding search result.

An associated difficulty in this area is that no one can guarantee the quality of the translation so that the search result may turn out to contain a vast number of unrelated websites. The situation will be even worse when the search request is inaccurately translated. At the end of the day, it may be that the search result contains web data which are completely irrelevant.

Moreover, even though the translation per se is satisfactory in quality, the relevant websites may not be of relevance with respect to the search request. More specifically, the search engine may match the search request with the registered websites in its database and pick up those websites which have been written in foreign languages and contain the relevant search request as translated by the information center. A problem for this method is that since the search request as translated is matched word by word from the websites contained in the database, as a result, the website picked may be totally out of context and therefore, totally irrelevant to the search result.

SUMMARY OF THE PRESENT INVENTION

A main object of the present invention is to provide a commercial information search system and a method thereof for searching commercial information, wherein a search request and a search result are both confined to a predetermined language so as to optimize a search application for particular users.

Another object of the present invention is to provide a commercial information search system and a method thereof which are capable of producing an optimized search result with a selected language so as to eliminate irrelevant web data which may have been generated upon translation of the search request by the conventional search engine or the information center.

Another object of the present invention is to provide a commercial information search system and a method thereof which is easy and convenient to use, interactive and accurate.

Accordingly, in order to accomplish the above objects, the present invention provides a commercial information search system, comprising:

an information center which comprises an information databases storing a plurality of web data characterized by a plurality of languages respectively, wherein the information center is adapted for a user accessing through a public communication network; and a search interaction platform communicatively linking with the information center, wherein when a search request with a selected language is sent to the information center through the public communication network, the information center sorts out the web data to match with the search request to generate a search result based on the web data with the selected language, so as to eliminate unrelated web data with other languages being translated into the selected language to be shown in the search result.

Moreover, the present invention also provides a method of searching commercial information, comprising the steps of:

(a) providing information center which comprises an information databases storing a plurality of web data characterized by a plurality of languages respectively, wherein the information center is adapted for a user accessing through a public communication network;

(b) receiving a search request characterized in a selected language;

(c) sorting out the web data to match with the search request based on the web data with the selected language; and (d) generating a search result, wherein unrelated web data with other languages being translated into the selected language is blocked to eliminate the unrelated web data shown in the search result.

These and other objectives, features, and advantages of the present invention will become apparent from the following detailed description, the accompanying drawings, and the appended claims.

DETAILED DESCRIPTION OF THE PREFERRED EMBODIMENT

Figure 1:
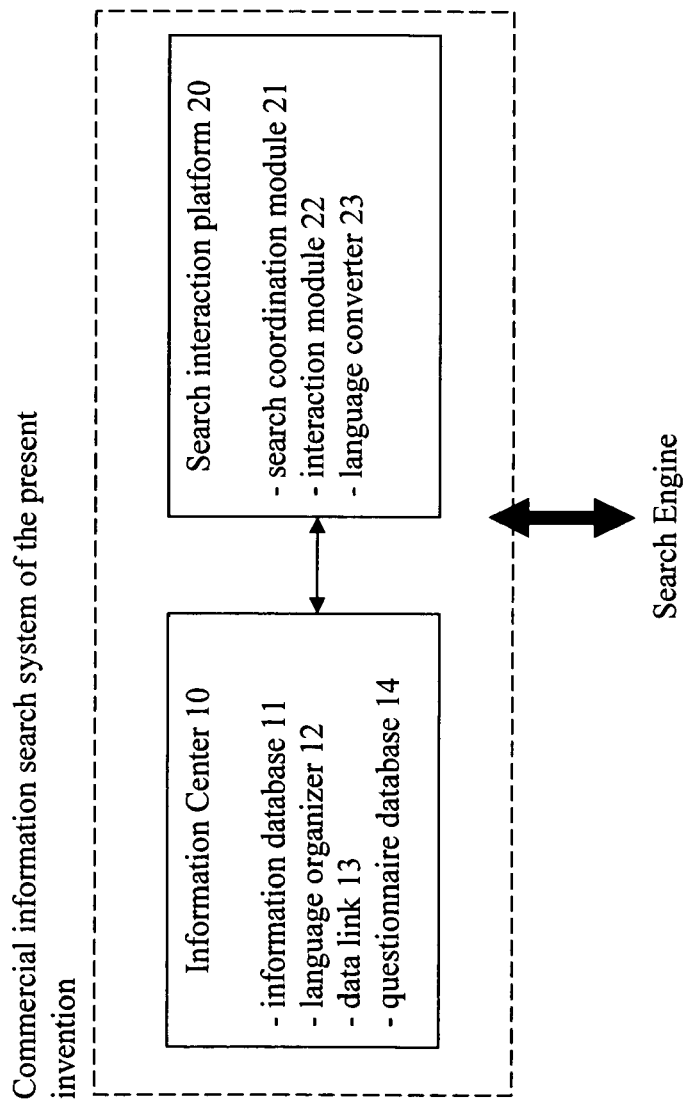
FIG. 1 is a schematic diagram of a commercial information search system according to a preferred embodiment of the present invention.

Referring to FIG. 1 of the drawings, a commercial information search system according to a preferred embodiment is illustrated, in which the search system comprises an information center 10, and a search interaction platform 20.

The information center 10 comprises an information database 11 which stores a plurality of web data characterized by a plurality of languages respectively, wherein the information center 10 is adapted for a user to access through a public communication network, such as Internet.

The search interaction platform 20 is communicatively linking with the information center 10, wherein when a search request with a selected language is sent to the information center 10 through the public communication network, the information center 10 will sort out the web data to match with the search request to generate a search result based on the web data with the selected language, so as to eliminate unrelated web data with other languages being translated into the selected language which is to be shown in the search result.

According to the preferred embodiment of the present invention, the search request is sent to the search information platform 20 by a user's search engine, which may be embodied as the user's computer, via the public communication network. The information center 10 may actually comprise a plurality of databases 11 for stored web data in different languages. For example, an English database may store web data which is written in English. Likewise, a German database may be arranged to store web data which is written in German. Alternatively, the database 11 can be partitioned into a plurality of sections each characterized by a predetermined language so that only web data written in a corresponding language is allowed to store in that corresponding sections of the database 11.

According to the preferred embodiment of the present invention, the information center 10 further comprises a language organizer 12 organizing the web data into a plurality of language portfolios for storing the web data in different the languages in the relevant sections of the database 11 respectively, such that when the search request with the selected language is received, the information center 10 sorts out the web data in the respective language portfolio with respect to the selected language for speeding up a searching process of the information center. In other words, the language organizer 12 helps to identify the selected language and facilitate searching in the relevant sections of the database which are corresponding with the selected languages.

As a result, when a search request in the selected language is received from the search engine, the web data in the corresponding sections of the database 11 or the corresponding database 11 will be sorted out and matched with the search request to generate the search result.

Figure 2:
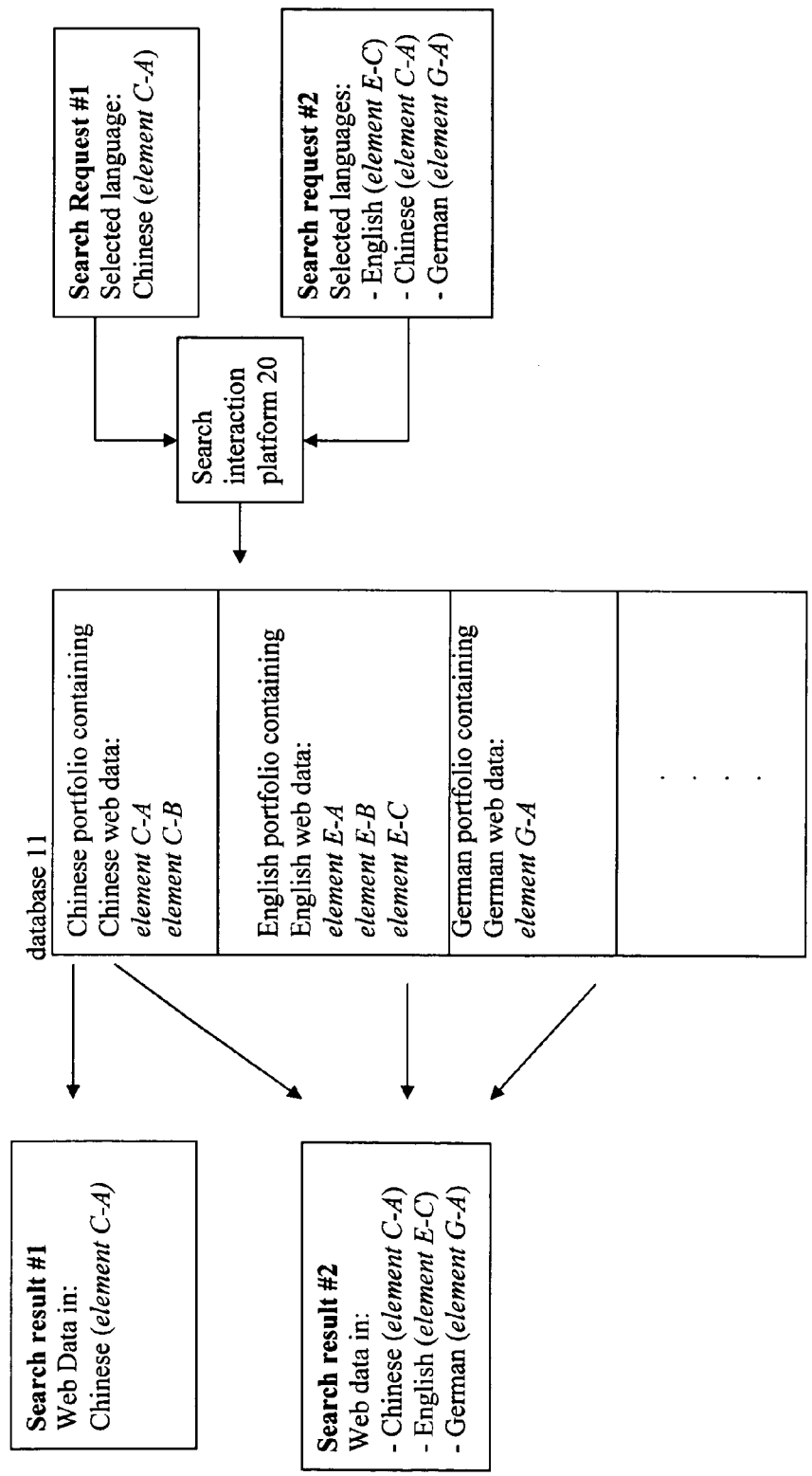
FIG. 2 is a schematic diagram of a commercial information search system according to the above preferred embodiment of the present invention, illustrating that search requests with different selected language are matched with different web data with the corresponding language.

Referring to FIG. 1 to FIG. 2 of the drawings, the search interaction platform 20 comprises a search coordination module 21 linked with the information center 10 and the user's search engine to receive the search request and send the search result back to the search engine via the public communication network. The search coordination module 21 is preferably embodied as a central processing unit for coordinating and processing information exchange between the information center 10 and the user's search engine.

The search interaction platform 20 further comprises an interaction module 22 linked with the search coordination module 21 to generate an interactive display for use in the user's search engine. For example, the interaction module 22 is adapted to generate an interactive website for being access by the user's search engine so as to provide an interactive platform for the user to perform the search of the relevant commercial information by the present invention.

It is worth mentioning that the information center 10 and the search interaction platform 20 do not perform translation of the search request for matching with the web data stored in the database 11. Instead, when the search request is sent to the search interaction platform 20, the selected language is identified and the search request is matched with the corresponding section of the database which stores web data in that selected language.

Referring to FIG. 2 of the drawings, the information center 10 further comprises a data link 13 linking the web data in different languages in relation with a same web provider, such that when the search request with the selected language is received, the information center 10 will sort out the web data with the selected language while the corresponding web data in different language of the same web provider is optionally shown in the search result. In other words, relevant web data written in a language different from the selected language will also be given in the search result. However, it is worth mentioning that there involves no translation because the link between the web data is derived from the identity of the web provider.

In order to further enhance the search optimality and accuracy of the present invention, the information center 10 further comprises a questionnaire database 14 containing a plurality of searching queries, wherein when the search request with the selected language is received, at least one of the corresponding searching queries written in the selected language is linked to show in the search result for further narrowing down the search request to precisely define the search request. As such, the scope of search will be substantially refined, thereby rendering the search resulting becoming more accurate and optimal.

Moreover, the search interaction platform 20 further comprises a language converter 23 selectively converting the search request in an input language into the search request in the selected language when the input language is different from the selected language, such that the input language is selectively converted into the selected language before the information center 10 sorts out the web data to match with the search request based on the web data with the selected language. It is worth clarifying at this point that the present invention is not meant to perform translation for the user. Instead, the language converter 23 is provided to facilitate input of search request in a wide variety of languages. For example, when the user is trying to search a Japanese company, but he/she does not know how to input a Japanese search request, then he/she may just type in an English search request and the language converter 23 will converts his/her English input into Japanese. The information center 10 will then perform the necessary sorting and matching as though the search request is inputted in Japanese.

Figure 3:
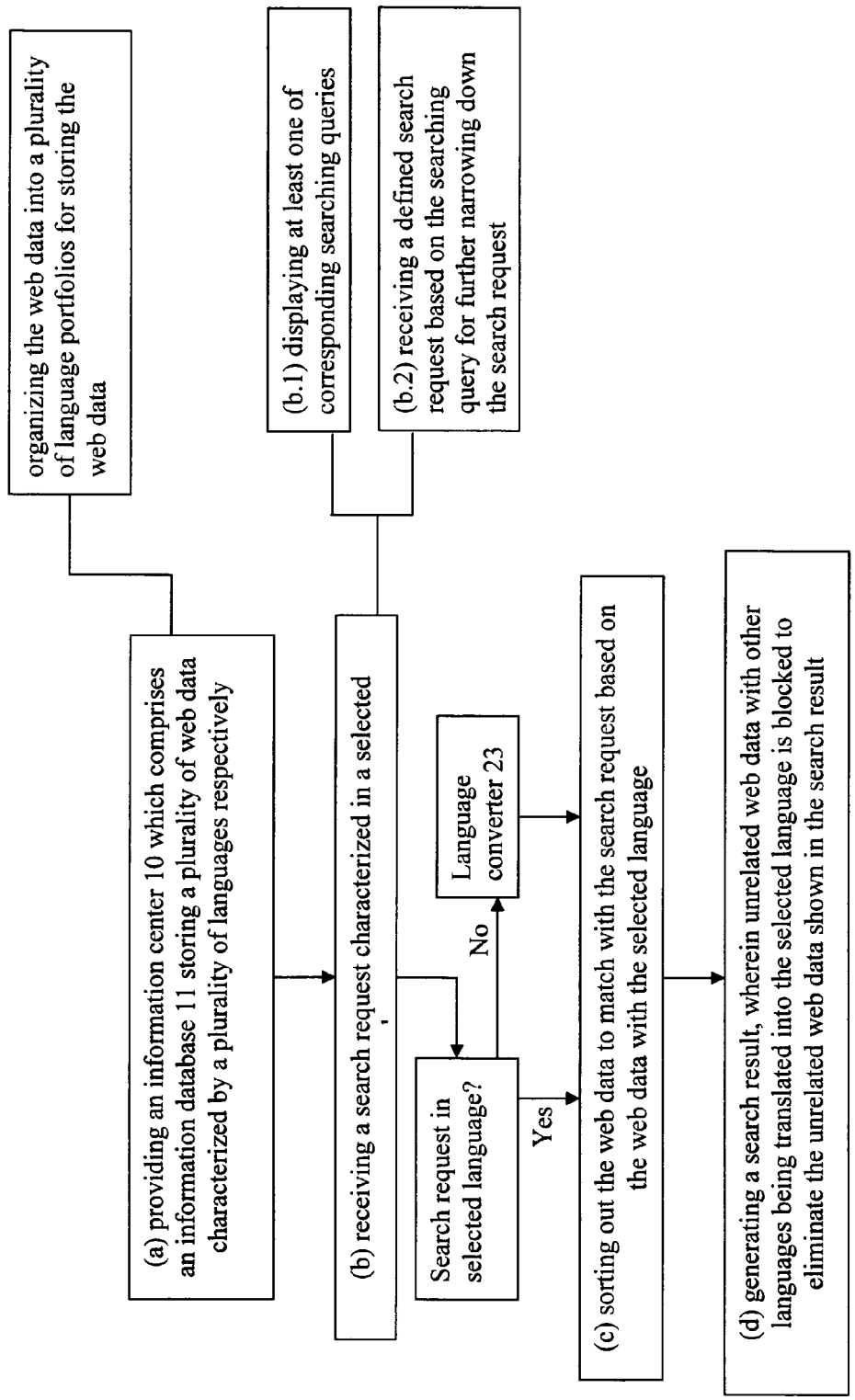
FIG. 3 is a flow diagram of a method of searching commercial information according to the above preferred embodiment of the present invention.

Referring to FIG. 3 of the drawings, a method of searching commercial information according to the preferred embodiment of the present invention is illustrated, in which the search method comprises the steps of:

(a) providing an information center 10 which comprises an information database 11 storing a plurality of web data characterized by a plurality of languages respectively, wherein the information center 10 is adapted for a user accessing through a public communication network;

(b) receiving a search request characterized in a selected language;

(c) sorting out the web data to match with the search request based on the web data with the selected language; and (d) generating a search result, wherein unrelated web data with other languages being translated into the selected language is blocked to eliminate the unrelated web data shown in the search result.

As mentioned earlier, the database 11 is divided into a plurality of sections each of which stored web data of a predetermined language so that a search request with a particular selected language is then matched with the relevant section of the database 11. Thus the method further comprises a step, in between step (b) and step (c), of identifying a selected language stipulated in the search request. The selected language may be expressly specified in the search request, or impliedly taken to be the language in which the search request is made. For example, where the search request is made in English, the selected is taken to be English. Likewise, if the search request is made in Chinese, the selected language is taken to be Chinese and the corresponding sections in the database 11 will be searched for any relevant Chinese web data. No translation of the search request will be taken place.

Step (a) further comprises a step of organizing the web data into a plurality of language portfolios for storing the web data in different the languages respectively, such that the search request in the selected language matches with the respectively language portfolio to sort out the web data therein.

Moreover, with regards to the above-mentioned data link 13, step (a) further comprises the steps of (a.1) linking the web data in different languages in relation with a same web provider; and (a.2) optionally associating with the corresponding web data in different language of the same web provider to show in the search result.

Step (b), further comprises the steps of:

(b.1) displaying at least one of corresponding searching queries written in the selected language; and (b.2) receiving a defined search request based on the searching query for further narrowing down the search request to precisely define the search request.

As mentioned earlier, in receiving the search request, the language converter 23 may optionally convert the inputted language into the selected language. Thus, step (b) further comprises a step of selectively converting the search request in an input language into the search request in the selected language when the input language is different from the selected language, wherein that the input language is selectively converted into the selected language before the information center 10 sorts out the web data to match with the search request based on the web data with the selected language.

In step (d) above, the search result is made basing on the web data in the corresponding sections of the database 11 so that the search result is written in the selected language as specified on the search request.

In order to enhance the search function of the present invention, the search result can be classified into a predetermined number of classification items wherein each of the classification items shows a group of web data which is relevant to the search request submitted by the user of the present invention. For example, the user may search for Japanese restaurants. In such a situation, the search result is written in the form of a list of Japanese restaurants in Japanese.

Moreover, the search request may specify a plurality of selected languages so that the relevant sections of the database 11 is sorted and generate the search result in each of the selected languages which reflect the corresponding web data in the database 11. For example, a user may simultaneously search Chinese and Spanish restaurants in the database. When the search interaction platform 20 receives the search request, the corresponding web data will be sorted out wherein the search result will list the relevant Chinese and Japanese restaurants in Chinese and Japanese respectively.

Since the searching method of the present invention is language specific without involving translation, it further comprises the step of registering web data in at least one language to store in the relevant database 11 of the information center. If the language in which the web data is written does not exist in the database, a new section in the database will be created to store such web data. On the other hand, the method further comprises a step of periodically updating the database 11 for keeping up-to-date the web data. This updating sub-step may be performed by receiving periodic updates from the corresponding websites from which the web data is provided, or by regularly chasing update information in relation to the websites from which the corresponding web data are provided.

From the forgoing descriptions, two typical applications of the present invention can be envisaged. First, the present invention may acts as yellow pages for searching particular web data. Second, the present invention may be utilized to search maps in a particular locality. For example, a search request may contain search for, say, Ynez Avenue in Monetary Park, Calif. By default, the search result may contain a map written in English. However, if a Chinese version of the map is also provided in the database 11, the data link 13 may point to this Chinese map and the user is able to get this map as well. It may be that the user is actually a Chinese, but who does not know how to input a Chinese name of 'Ynez Avenue'. In such a situation, the language converter 23 or the data link 13 may help him/her to search for a relevant Chinese map. Moreover, he/she may simply enter Chinese as a selected language in the search request for performing the necessary search (even though the input language is in English).

From the forgoing descriptions, it can be shown that the above objects have been substantially accomplished. The present invention provides a search system and method thereof for searching commercial information, wherein a search request and a search result are both confined to a predetermined language so as to optimize a search application for particular users.

One skilled in the art will understand that the embodiment of the present invention as shown in the drawings and described above is exemplary only and not intended to be limiting.

It will thus be seen that the objects of the present invention have been fully and effectively accomplished. It embodiments have been shown and described for the purposes of illustrating the functional and structural principles of the present invention and is subject to change without departure from such principles. Therefore, this invention includes all modifications encompassed within the spirit and scope of the following claims.

What is claimed is:

1. A commercial information search system, comprising:
    an information center, which is adapted for a user accessing through a public communication network, comprising:
    an information database containing a plurality of language portfolios characterized by a plurality of languages, wherein each of said language portfolios is arranged for storing a plurality of web data provided by a plurality of web providers that each of said web providers is adapted to provide one or more said web data in different languages to store in one of more language portfolios corresponding to said language of said web data, wherein said web data stored in different language portfolios are formed in a non-translating manner;

a data link linking said web data in said language portfolios in relation with the same web provider in such a manner that when said web provider provides more than one web data to be stored said different language portfolios, said web data with different languages are linked with each other so as to indicate said web data are provided by the same web provider;

a search interaction platform communicatively linking with said information center, wherein when a search request with a selected language is sent to said information center through said public communication network, said information center sorts out said web data stored in said corresponding language portfolio to match with said search request to generate a search result based on said web data with said selected language, so as to eliminate unrelated web data with other languages being translated into said selected language to be shown in said search result;

a language organizer organizing said language portfolios to store said web data in different said languages respectively, such that when said search request with said selected language is received, said information center sorts out said web data in said respective language portfolio with respect to said selected language for speeding up a searching process of said information center, wherein said information center not only sorts out said web data stored in said corresponding language portfolio to match with said search request to generate said search result but also sorts out said web data stored in other said language portfolio to indicate in said search request when said web data stored in said different language portfolios are provided by the same web provider, wherein said search interaction platform further comprises a language converter selectively converting said search request in an input language into said search request in said selected language when said input language is different from said selected language, wherein said input language is selectively converted into said selected language before said information center sorts out said web data to match with said search request based on said web data with said selected language.

2. The commercial information search system, as recited in claim 1, wherein said information center further comprises a questionnaire database containing a plurality of searching queries, wherein when said search request with said selected language is received, at least one of said corresponding searching queries written in said selected language is linked to show in said search result for further narrowing down said search request to precisely define said search request.

3. A method of searching commercial information, comprising the steps of:
(a) providing an information center for a user accessing through a public communication network, wherein said information center contains a plurality of language portfolios characterized by a plurality of languages, wherein each of said language portfolios is arranged for storing a plurality of web data provided by a plurality of web providers that each of said web providers is adapted to provide one or more said web data in different languages to store in one of more language portfolios corresponding to said language of said web data, wherein said web data stored in different language portfolios are formed in a non-translating manner, wherein said web data in said language portfolios in relation with the same web provider are linked with each other in such a manner that when said web provider provides more than one web data to be stored said different language portfolios, said web data with different languages are linked with each other so as to indicate said web data are provided by the same web provider, said step (a) further comprising a step of organizing said language portfolios to store said web data in different said languages respectively, wherein when said search request with said selected language is received, said information center sorts out said web data in said respective language portfolio with respect to said selected language for speeding up a searching process of said information center;
(b) receiving a search request characterized in a selected language;
(c) sorting out said web data stored in said corresponding language portfolio to match with said search request based on said web data with said selected language; and
(d) generating a search result in responsive to said selected language, wherein unrelated web data with other languages being translated into said selected language is blocked to eliminate said unrelated web data shown in said search result, wherein said step (b) further comprises a step of selectively converting said search request in an input language into said search request in said selected language when said input language is different from said selected language, wherein that said input language is selectively converted into said selected language before said information center sorts out said web data to match with said search request based on said web data with said selected language; and wherein, in the step (c), further comprises a step of sorting out said web data stored in other said language portfolio to indicate in said search request when said web data stored in said different language portfolios are provided by the same web provider such that said search request contains not only said web data stored in said corresponding language portfolio matching with said search request in said selected language but also said web data stored in other different language portfolio matching with the same web provider.

4. The method as recited in claim 3, after the step (b), further comprising the steps of:
(b.1) displaying at least one of corresponding searching queries written in said selected language; and
(b.2) receiving a defined search request based on said searching query for further narrowing down said search request to precisely define said search request.

5. The method, as recited in claim 4, further comprising a step of periodically updating each of said language portfolios for keeping up-to-date of said web data therein, wherein said updating is performed by receiving regular updates from said web provider.

6. The method, as recited in claim 3, further comprising a step of periodically updating each of said language portfolios for keeping up-to-date of said web data therein, wherein said updating is performed by receiving regular updates from said web provider.

7. The method, as recited in claim 3, further comprising a step of periodically updating each of said language portfolios for keeping up-to-date of said web data therein, wherein said updating is performed by receiving regular updates from said web provider.

* * * * *